United States Patent [19]

Näsman et al.

[11] Patent Number: 5,326,825
[45] Date of Patent: Jul. 5, 1994

[54] PROCESS FOR THE PREPARATION OF A GRAFT COPOLYMER BOUND CATALYST

[76] Inventors: Jan H. Näsman, Dragonvägen 58 a C 48, SF-20720 Åbo; Mats J. Sundell, Kuppisgatan 89 b 8, SF-20810 Åbo; Kenneth B. Ekman, Isännänkatu 13 C 34, SF-20780 St. Karins, all of Finland

[21] Appl. No.: 982,495

[22] Filed: Nov. 27, 1992

[51] Int. Cl.$^5$ ............... C08F 255/02; C08F 259/08
[52] U.S. Cl. ..................................... 525/301; 502/326
[58] Field of Search ......................... 525/301

[56] References Cited

U.S. PATENT DOCUMENTS 4,950,549  8/1990  Rolando et al. ............... 525/301
4,990,572  2/1991  Miyazono et al. ............. 525/301

OTHER PUBLICATIONS

Synthesis and Separations Using Functional Polymers, Edited by D. C. Sherrington and P. Hodge, pp. 123–147 (1988).
Hartley et al., J. Polymer Science, 20, 2395–2408 (1982).
Garnett et al., J. Polymer Science, 19, 23–28 (1981).
Akelah et al., J. Applied Polymer Science, 28, 3137–3144 (1983).
Guyot et al., Reactive Polymers, 16, 233–259 (1991/1992).
Stannett, Radiol. Phys. Chem., 35, 82–87 (1990).

*Primary Examiner*—Vasu S. Jagannathan
*Attorney, Agent, or Firm*—Birch, Stewart, Kolasch & Birch

[57] ABSTRACT

The object of the present invention is a process of preparation of a graft copolymer obtained by pre-irradiation grafting of vinyl monomers onto polyolefins or fluorinated polyethylenes, in particular, of grafting acrylic or methacrylic acid onto polyethylene and/or polypropylene and subsequently loading a metal, such as a transition metal on the graft copolymer obtained. Such metal-loaded graft copolymers find use, especially as catalysts, e.g. for hydrogenation reactions.

6 Claims, 1 Drawing Sheet

PROCESS FOR THE PREPARATION OF A GRAFT COPOLYMER BOUND CATALYST

FIELD OF INVENTION

This invention relates to a process of preparing a metal loaded graft transition metal loaded copolymer found catalyst, in particular a copolymer bound catalyst that is very easy to separate from the reaction solution, and which is non-pyrophoric and reusable. The catalyst according to the present invention is especially suitable for use in continous flow processes. The invention also relates to the said graft copolymer bound catalyst obtainable by the said process, as well as to the use of said graft copolymer bound catalyst e.g. in hydrogenation reactions.

BACKGROUND OF THE INVENTION

The idea of anchoring transition metal catalysts to organic polymers has interested scientists, wherein bound catalyst studies have been made to produce heterogenized catalyst systems having the distinguishing characteristic of being easily separable from the reaction media (Hodge, P., Sherrington, D. C. (Eds.), *Synthesis and separations using functional polymers*, John Wiley & Sons, New York, (1988)).

Transition metal polymer-bound catalysts may offer a number of advantages, such as greater catalytic activity, due to lack of formation of ligand-bridged complexes as one catalytic site may be isolated from another, two active catalysts anchored to the same polymer backbone can in some cases be used to conduct sequential multistep organic synthesis, minimized losses during use of polymeric catalysts, increase of substrate selectivity due to an increase in the steric environment. Further, the selectivity of the polymer towards different substrates can be controlled by the loading of the catalyst on the polymer support, controlling the degree of resin swelling and introducing optically active groups in the polymer around the active site.

A polymer support used in a particular application should fulfill a number of important functions simultaneously. First, the support must possess the correct mechanical properties. For example, in column or batch applications, resin beads must be mechanically strong enough compression and fractional friction. Secondly, the support must possess the correct physical structure in order to ensure that a high amount of the functional groups in the material are accessible to the reaction phase. Finally, the support must provide the correct microenvironment to optimize the process being carried out, e.g. it must provide the correct polarity, hydrophilicity, microviscosity etc. In general, these support requirements have been demanded by default rather than by careful argument and design. When looking at the traditional styrene divinylbenzene resins it seems clear that the desirable features, especially in the accessibility-capacity relation, tend to be mutually exclusive and that for any particular application a compromise had to be made (Guyot, A., *Reactive Polymers*. 16 (1992), 233).

Further, since polymer supported catalysts are more expensive than their homogeneous analogues, it is vital that they can be recycled.

A useful method for preparing polymer bound reactants, with a potential of solving many of the problems mentioned above, is grafting, and especially radiation grafting, which offers promising new opportunities (Hartley, F. R., *J. Polym. Sci., Polym. Chem. Ed.*, 20, (1982), 2395; Garnett, J. L., *J. Polym. Sci., Polym. Lett.*, 19, (1981), 23; Akelah, A., *J. Appl. Polym. Sci.*, 28, (1983), 3137). Radiation grafting involves taking a polymer with appropriate morphology and physical properties and introducing reactive sites, free radicals, into the polymer chain by irradiation. The free radicals can either combine to give cross-links, as is the case for example polyethylene, or cause chain scission, as is the case for polypropylene. In the presence of vinyl monomers, on the other hand, the free radicals can initiate graft copolymerization.

The preparation of graft copolymers and the use of graft copolymers in a variety of applications are well known in both literature and patents (Stannet, V. et. al., *Radiat. Phys. Chem.*, 35, (1990)).

Three different methods of radiation grafting have been developed and most of the work done has concentrated on the use of low dose rate gamma rays from $^{60}Co$ sources. During the past few years, however, there has been much interest in using high energy electrons from accelerators with high dose rates ($10^6$–$10^9$ rads/sec), since these high dose rates make radiation chemical processes commercially more attractive. The chemistry involved is, however, similar whether gamma or electron radiation is utilized, and therefore the graft result using the different sources does not significantly differ. The three methods of radiation grafting that have received special attention are: (1) direct radiation grafting of a vinyl monomer onto a polymer (mutual grafting), (2) grafting on radiation-peroxidized polymers (peroxide grafting) and (3) grafting initiated by trapped radicals (pre-irradiation grafting).

Mutual grafting by irradiating of the polymer in the presence of the monomer is a fairly simple and effective method, since the free radicals initiate polymerization immediately upon generation. The disadvantage of this method is, however, that simultaneously with the graft copolymerization, homopolymerization of the monomer occurs upon irradiation.

When grafting on radiation-peroxidized polymers, the polymer is first irradiated in the presence of oxygen, thus forming peroxides and hydroperoxides that are stable and can be stored in the polymer for a long period of time. Grafting is activated by cleavage of the peroxides or hydroperoxides by heat, UV-light or catalysts in a monomer solution.

Pre-irradiation grafting by irradiation of the polymer alone in an inert atmosphere and immersing the irradiated polymer in a monomer solution requires additional steps in comparison to direct radiation or mutual grafting, but the advantage is that only a small amount of homopolymer is formed, mainly by a chain transfer process. The pre-irradiation grafting process is controlled by the diffusion of the monomer in the polymer and can to some extent be facilitated by the use of solvents that are able to swell the formed graft copolymer.

Pre-irradiation grafting is mostly preferred since this method produces only small amounts of homopolymer in comparison to mutual grafting.

SUMMARY OF THE INVENTION

The object of the present invention is a process of the preparation of a graft copolymer obtained by pre-irradiation grafting of vinyl monomers onto polymers, in particular, onto polyolefins, and subsequently loading a metal, such as a transition metal on the graft copolymer obtained. Such metal-loaded graft copolymers find use especially as catalysts, e.g. for hydrogenation reactions.

DETAILED DESCRIPTION OF THE INVENTION

Figure 1:
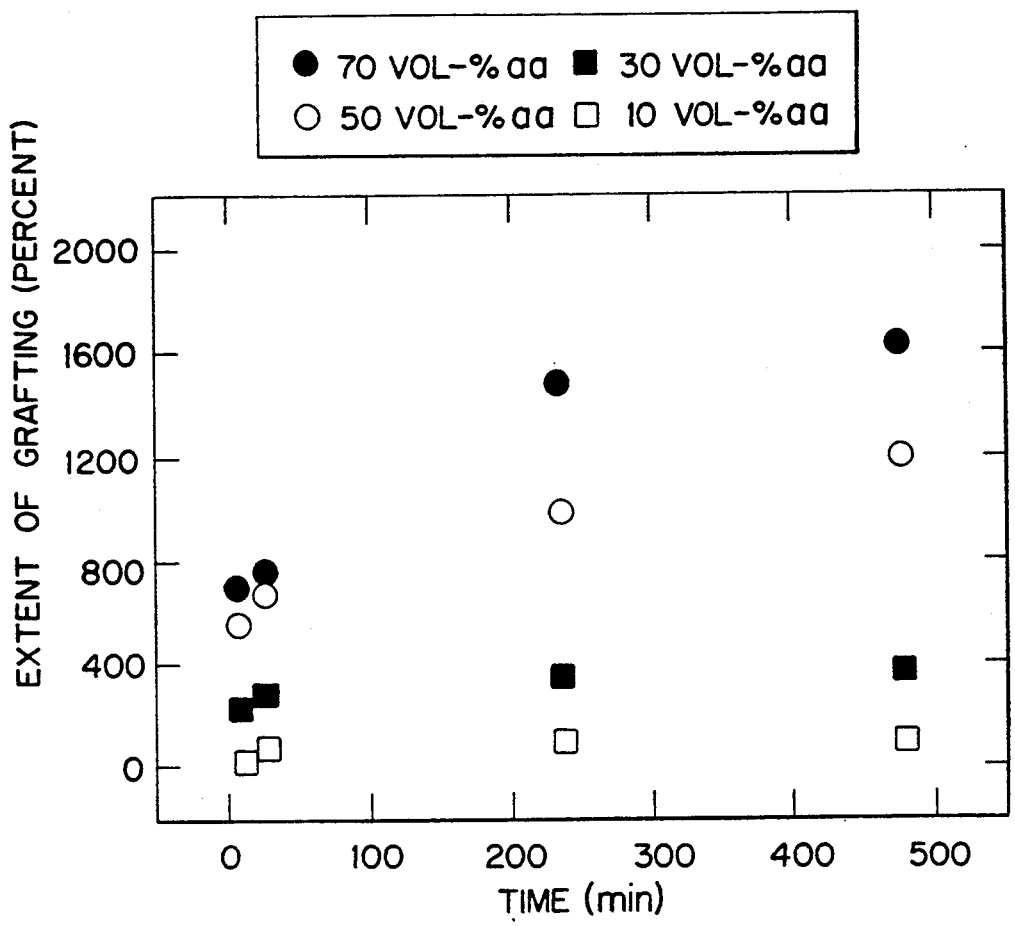

More specifically the invention relates to a process which comprises the steps of exposing an organic polymer selected from the group of polyolefins and fluorinated polyethylenes to radiation in an inert atmosphere, immersing the irradiated polymer in an aqueous solution of a monomer selected from the group of acrylic acid, methacrylic acid and a mixture thereof, separating the resulting graft copolymer, and loading a metal onto the graft copolymer.

The polymers grafted according to the invention exhibit many feasible properties, such as having non-crosslinked grafted side chains, a polymer support which is chemically inert and mechanically rigid, the possibility of achieving a very high capacity, i.e. a high extent of grafting, as well as a high accessibility if the grafted copolymer is allowed to swell in a suitable solvent. The graft copolymers obtained usually combine both excellent chemical resistance and mechanical strength, and a great advantage is that a polymer sample in any form of a film, fiber, pellets, hollow fiber, membrane or non-woven can be graft modified. Surprisingly the metal loaded graft copolymer bound catalyst can be recycled and reused in several subsequent hydrogenation reactions and is non-leaching, which has been major problem with previous known catalysts (Hodge, P., Sherrington, supra p. 134, 135 and 138).

The process according to the invention is illustrated in the following reaction scheme outlining the steps of grafting and subsequently loading the obtained graft copolymer with a metal.

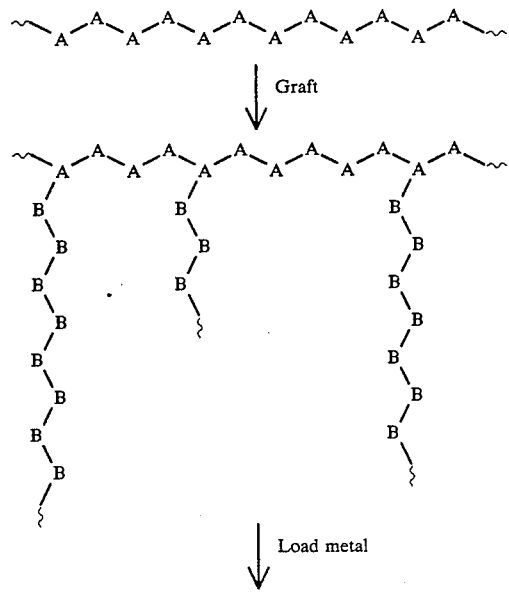

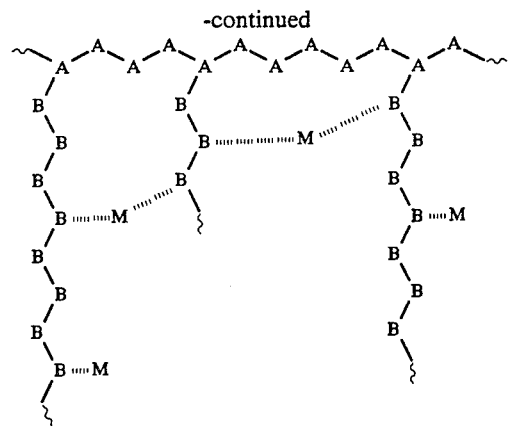

When the organic polymer is a polyolefin, A is —CH$_2$—CHR— wherein R is H or (CH$_2$)$_n$CH$_3$, wherein n is 0 to 20, or, when the organic polymer is a fluorinated polyethylene, A preferably has the meaning of —CF$_2$—CX$_2$— wherein each X is H or F, B is —CH$_2$—CR$_1$(COOH)— wherein R$_1$ is H or CH$_3$, and M is a metal, preferably Pd or Ru. The weight ratio B/A is from 0.5 to 20, preferably 1 to 6, and the mole ratio M/B is from 0.001 to 0.5, preferably 0.01 to 0.1.

The polyolefins used are thus polymers formed from α-olefins. According to a preferred embodiment, the α-olefins used contain up to 8 carbon atoms (n=6). Particularly preferred polyolefins are homo- and co-polymers of ethylene or propylene. The fluorinated polyethylene backbone is preferably polyvinylidene fluoride or polytetrafluoroethylene, i.e. Teflon.

The process according to the invention thus comprises a first step of irradiating the polymer sample with electrons (or any other form of ionizing radiation) from an accelerator under an inert atmosphere (<300 ppm O$_2$), by using a radiation dose that is dependent on the sample treated. The irradiated polymer samples are then immersed in acrylic or methacrylic acid/water solutions at selected temperatures, and graft copolymer samples, modified with different amounts of polyacrylic/polymethacrylic acid, can be prepared by varying the reaction time and the concentration of monomer in the graft solution. The concentration of monomer in the graft solution can vary widely, and is typically it is from e.g. 10 to 70% by volume, at which concentration a suitable extent of grafting for most purposes can be achieved. For the purpose of the invention an extent of grafting of appr. 50 to 2000%, preferably 100 to 600% is suitable. Under typical manufacturing conditions such a preferred concentration is normally achieved by using a concentration of monomer of appr. 10 to 50% by volume.

It is necessary to remove in advance any dissolved oxygen from the aqueous solution of the monomer by purging the solution with nitrogen, since oxygen readily inhibits the progress of the graft reaction. It may also be effective to add Mohr's salt to inhibit the formation of acrylic/methacrylic acid homopolymer during the grafting. The resulting graft copolymers are e.g. Soxhlet extracted with water overnight to remove unreacted monomer and homopolymer. The grafted samples are then usually dried to constant weight, prior to loading, e.g. in an oven. The extent of grafting is determined according to $$\frac{(m_1 - m_0) * 100}{m_0} = \text{extent of grafting (\%)}$$

$m_0$ = weight of the original sample
$m_1$ = weight of the grafted sample

The temperature of the graft solution can be varied in the range of 20°-80° C., but the graft reaction is more easily controlled in the temperature range of 20°-50° C.

After grafting, metal ions, preferably transition metal ions, are loaded onto the graft copolymer e.g. in an ion-exchange reaction. If the graft copolymer is dried after the grafting step, the graft copolymer is swollen prior to loading with the metal, advantageously by keeping the graft copolymer in a suitable solvent, such as water, overnight in order to achieve maximum swelling. A water solution of e.g. a suitable transition metal salt, such as a chloride, is added and the mixture is stirred e.g. for 48 h. The resulting metal loaded graft copolymer is extracted, such as Soxhlet extracted, with water e.g. for 24 h to remove any unbound ions, and dried.

The amount of metal in the polymer can be determined e.g. by repeated extraction with 1M hydrochloric acid followed by direct current plasma emission spectroscopy (DCP) analysis of the extract.

The invention is explained more in detail by the following examples, but it should be noted that the invention is not to be limited by these examples.

EXAMPLE 1

Grafting of acrylic acid onto polypropylene film.

Polypropylene 50 μm thick films were irradiated under a nitrogen atmosphere using an Electrocurtain ® electron accelerator, operating at 175 kV, to a total dose of 50 kGy. The irradiated films were immediately immersed in aqueous solutions of acrylic acid, which were purged with nitrogen in advance for at least 30 minutes. The temperature of the graft solution was 70° C. Different graft copolymers were obtained by varying the amount of acrylic acid in the graft solution and the reaction time. When the reactions were terminated the grafted films were Soxhlet extracted with water overnight and the extent of grafting was calculated as described above. The extent of grafting as a function of reaction time and concentration of acrylic acid in the graft solution is presented in FIG. 1.

EXAMPLE 2

Grafting of acrylic acid onto polypropylene fibers.

Chopped polypropylene fibers (12 mm long) were placed in a sealable plastic bag and the bag was purged with nitrogen for at least 60 minutes and closed. The bag was irradiated with 10 MeV electrons from a linear accelerator (EB 10, Scanditronix) to a total dose of 25 kGy. The fibers were removed from the bag and immediately immersed in a nitrogen purged aqueous solution containing 50 vol % acrylic acid for 30 minutes at 70° C. The grafted fibers were Soxhlet extracted with water overnight, dried to constant weight and the extent of grafting was calculated to 250%.

EXAMPLE 3

Grafting of acrylic acid onto polypropylene non-woven.

A polypropylene non-woven fabric was irradiated under a nitrogen atmosphere using an Electrocurtain ® electron accelerator, operating at 175 kV, to a total dose of 500 kGy. The fabric was immediately immersed in a nitrogen purged aqueous solution containing 30 vol % acrylic acid for 4 hours at 40° C. The grafted fabric was Soxhlet extracted overnight and the extent of grafting was calculated to 630%.

EXAMPLE 4

Preparation of a polymer supported palladium catalyst.

10 g of a polyacrylic acid grafted polypropylene fiber, prepared as outlined in Example 2, was allowed to swell in distilled water overnight. To the swollen fibers 0.78 g $PdCl_2$ was added in large amount of distilled water. The fibers turned brown almost immediately. The mixture was stirred for 48 h or until a completely clear solution was obtained. After this the palladium loaded polymer was separated, rinsed with water, Soxhlet extracted with water for 24 h and finally dried. The amount of palladium in the fiber was determined by repeated extraction with 1M hydrochloric acid followed by DCP analysis of the extract. The amount of palladium was found to be 0.44 mmol Pd/g fiber.

EXAMPLE 5

Preparation of a non-woven fabric supported palladium catalyst.

1 g of a non-woven fabric prepared as in Example 3 was allowed to swell in distilled water overnight. To the swollen non-woven was added 0.16 g $PdCl_2$ in distilled water. The mixture was stirred for 48 h. After this the palladium loaded fabric was separated, rinsed with water, Soxhlet extracted with water for 24 h and finally dried. The amount of palladium in the fabric was determined by repeated extraction with 1M hydrochloric acid followed by DCP analysis of the extract. The amount of palladium was found to be 0.91 mmol Pd/g fiber.

EXAMPLE 6

Preparation of a polymer supported ruthenium catalyst.

1 g of a non-woven fabric prepared as in Example 3 was allowed to swell in distilled water overnight. To the swollen fabric was added 0.48 g $RuCl_4$ in distilled water. The mixture was stirred for 48 h. After this the ruthenium loaded fabric was separated, rinsed with water, soxhlet extracted with water for 24 h and finally dried.

EXAMPLE 7

Hydrogenation of 1-octene catalyzed by palladium loaded polypropylene-graft-poly(acrylic acid) fibers.

Before use the palladium loaded polymer, made according to the Example 4 and containing 0.44 mmol Pd/gram fiber, was treated with hydrogen in order to reduce palladium (II) to palladium (0), by suspending it in methanol and passing hydrogen gas through for two hours.

The hydrogenations of 1-octene were carried out in a 100 ml round-bottomed flask. The vessel was thermostated to 30° C., provided with a magnetic stirrer and connected to a gas burette that maintained the reaction at constant 1 atm. hydrogen pressure. In the reaction vessel 0.12 g of the dried palladium catalyst and 45 ml of methanol were placed. Stirring was started and the air in the system was displaced by repeating the process of evacuating and flushing with hydrogen three times.

Figure 2:
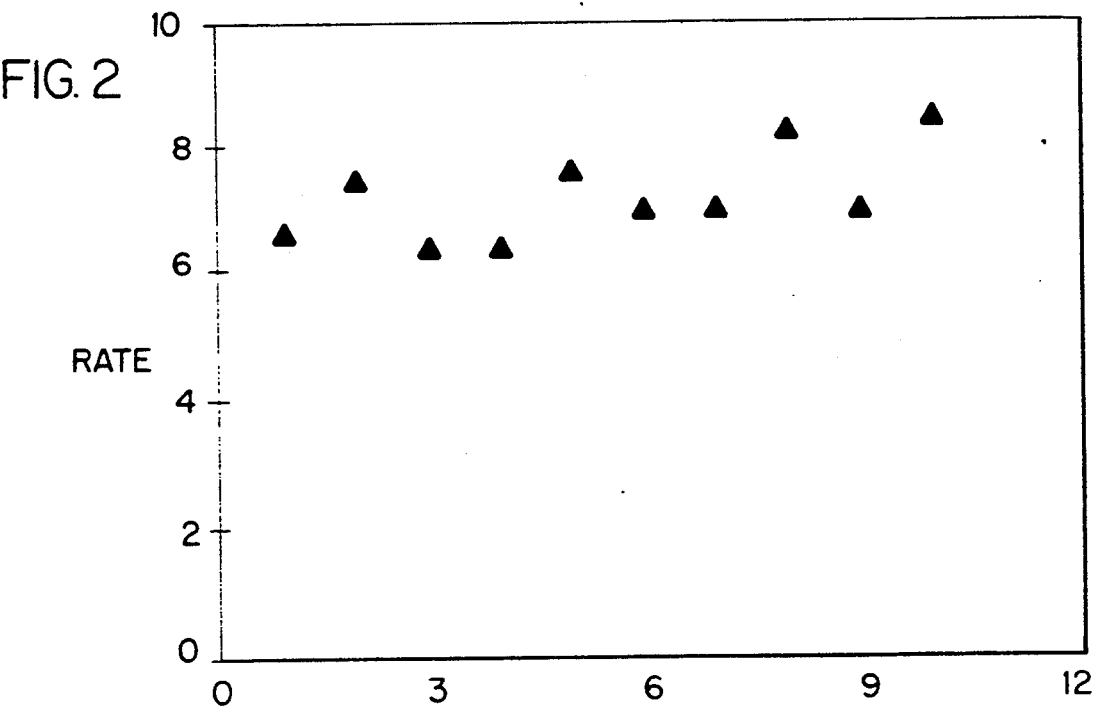

Finally, an adequate amount of hydrogen gas was stored in the gas burette, and the mixture was stirred 30 minutes to saturate the solution with hydrogen. The stirring was stopped and 5 ml of a 0.995M 1-octene solution in methanol was injected into the reaction vessel. The reaction was initiated by starting the stirrer. The stirring was 1000 rpm. The progress of the hydrogenation was followed by recording the hydrogen uptake vs. time. The initial rates of the hydrogenations were calculated from the slope of the amount of hydrogen absorbed versus the reaction time. The catalyst was easily recovered by decanting the reacting mixture and was reused after washing with methanol. The reaction rates and the catalytic activity varied very little over ten runs. The calculated rates can be seen in FIG. 2. A mean value for the half lifes found during the ten hydrogenation cycles was 25 minutes.

No palladium could be detected with direct current plasma emission spectroscopy (DCP) analysis of the reaction solutions after the catalyst was removed.

EXAMPLE 8

Hydrogenation of 1-octene catalyzed by palladium loaded polypropylene-graft-poly(acrylic acid) non-woven fabric.

Before use the palladium loaded fabric, prepared according to Example 5, was treated with hydrogen in order to reduce palladium (II) to palladium (0), by suspending it in methanol and passing hydrogen gas through for two hours.

0.12 gram of the polymer bound catalyst was used for the hydrogenation of 1-octene. The hydrogenations were carried out in accordance with Example 7. The catalyst was easily recovered by picking up the fabric from the reaction solution and was reused after washing with methanol. The catalyst was reused several times with similar reaction kinetics. The half life of the hydrogenation reaction was found to be 10 minutes. The reaction rate was found to be 0.2 ml $H_2$/sgPd.

We claim:

1. A metal loaded graft copolymer comprising a polymer backbone selected from the group consisting of polyolefins and fluorinated polyethylene, that is grafted with acrylic and/or methacrylic acid monomer, wherein the weight ratio between grafted monomer and polymer backbone being from 0.5 to 20, and the mole ratio between loaded metal and grafted monomer being from 0.001 to 0.5, the copolymer being obtained by exposing the said polymer backbone to radiation in an inert atmosphere, immersing the irradiated polymer in an aqueous solution of the monomer selected from the group consisting of acrylic acid, methacrylic acid and mixtures thereof, separating the resulting graft copolymer, and loading a transition metal ion onto the graft copolymer.

2. The metal loaded graft copolymer according to claim 1, wherein the weight ratio of said monomer to said polymer backbone is 1 to 6, and the mole ratio of said transition metal ion to said monomer is 0.01 to 0.1.

3. The metal loaded graft copolymer according to claim 1 or 2, wherein the polymer backbone is a polyolefin selected from the group consisting of polypropylene, polyethylene and mixtures thereof.

4. The metal loaded graft copolymer according to claim 1 or 2, wherein the polyolefin is polypropylene, and the monomer is acrylic acid.

5. The metal loaded graft copolymer according to claim 1 or 2, wherein the polyolefin is polypropylene, the monomer is acrylic acid, and the transition metal ion is selected from the group consisting of palladium and ruthenium ion.

6. The metal loaded graft copolymer according to claim 1 or 2, wherein the polymer backbone is in the form of fiber, hollow fiber, pellet, membrane, film, or non-woven fabric.

* * * * *